US009889809B2

(12) United States Patent
Ruthinowski

(10) Patent No.: US 9,889,809 B2
(45) Date of Patent: Feb. 13, 2018

(54) VEHICLE SEAT THERMISTOR FOR CLASSIFYING SEAT OCCUPANT TYPE

(71) Applicant: Ford Global Technologies, LLC, Dearborn, MI (US)

(72) Inventor: Richard Edward Ruthinowski, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 330 days.

(21) Appl. No.: 14/640,392

(22) Filed: Mar. 6, 2015

(65) Prior Publication Data

US 2016/0257272 A1    Sep. 8, 2016

(51) Int. Cl.
*B60R 21/015* (2006.01)
*G01K 13/00* (2006.01)
*B60N 2/00* (2006.01)

(52) U.S. Cl.
CPC ........ *B60R 21/01512* (2014.10); *B60N 2/002* (2013.01); *B60R 21/01516* (2014.10);
(Continued)

(58) Field of Classification Search
CPC ........ B60R 21/01512; B60R 21/01556; B60R 21/01516; B60R 21/01546; G01K 3/00;
(Continued)

(56) References Cited

U.S. PATENT DOCUMENTS

| 5,494,311 A * | 2/1996 | Blackburn | B60N 2/002 180/273 |
| 6,906,293 B2 * | 6/2005 | Schmiz | B60N 2/002 177/144 |

(Continued)

FOREIGN PATENT DOCUMENTS

| CN | 101402348 | * | 4/2009 | B60R 22/48 |
| JP | H10-0193958 | * | 7/1998 | B60H 1/32 |

(Continued)

OTHER PUBLICATIONS

Computer translation of JP 2010-23695, JPO website, May 2017.*
(Continued)

*Primary Examiner* — Randy Gibson
(74) *Attorney, Agent, or Firm* — LeClairRyan

(57) ABSTRACT

A thermistor-based system and method for distinguishing between adult and child passengers and, of the child passengers, between those seated in a child restraint system and those seated in a child booster is provided. The disclosed inventive concept includes at least one classification thermistor/temperature sensing device, at least one reference thermistor, an algorithm to compute and classify conditions, and related wiring and hardware. The classification thermistor/temperature sensing device is located in a seat cushion assembly and a seat back. The temperature sensors are used to detect heat transfer between an object in contact with the cushion through the seat trim and, if applicable, some amount of seat comfort base material. The reference thermistor may be provided to enhance robustness of classification determination. The algorithm computes and classifies conditions based on at least the magnitude and/or the rate of temperature change between the classification sensor and the reference sensor.

19 Claims, 4 Drawing Sheets

(52) U.S. Cl.
CPC .. *B60R 21/01546* (2014.10); *B60R 21/01556* (2014.10); *G01K 13/00* (2013.01)

(58) Field of Classification Search
CPC ............ G01K 7/22; G01K 7/25; G01K 13/00; G01K 17/00; G01K 17/20; G01K 2201/02; G01K 1/02; B60N 2/002; G01W 1/17; B60H 1/00
See application file for complete search history.

(56) References Cited

U.S. PATENT DOCUMENTS

| | | | | |
|---|---|---|---|---|
| 6,918,612 | B2 * | 7/2005 | Smith | B60R 21/01532 180/273 |
| 7,084,774 | B2 * | 8/2006 | Martinez | B60H 1/00742 236/44 C |
| 7,460,938 | B2 * | 12/2008 | Winkler | B60R 21/01516 180/273 |
| 7,500,536 | B2 * | 3/2009 | Bulgajewski | H05B 3/34 177/136 |
| 7,641,229 | B2 * | 1/2010 | Boisvert | B60N 2/002 180/273 |
| 8,818,637 | B2 | 8/2014 | Stanley et al. | |
| 8,870,451 | B2 * | 10/2014 | Mayer | B60N 2/5685 374/1 |
| 9,162,769 | B2 * | 10/2015 | Rauh | B64D 13/00 |
| 2003/0220766 | A1 * | 11/2003 | Saunders | B60N 2/002 702/173 |
| 2005/0098640 | A1 * | 5/2005 | Ichishi | B60H 1/00742 236/49.3 |
| 2006/0267321 | A1 | 11/2006 | Harish et al. | |
| 2008/0248736 | A1 * | 10/2008 | Aoki | B60H 1/00742 454/75 |
| 2009/0234542 | A1 | 9/2009 | Orlewski | |
| 2015/0003493 | A1 * | 1/2015 | Bieck | B60R 21/015 374/51 |
| 2015/0210186 | A1 * | 7/2015 | Baudu | B60N 2/002 297/217.3 |
| 2016/0121847 | A1 * | 5/2016 | Saitou | B60N 2/002 340/457.1 |
| 2017/0059415 | A1 * | 3/2017 | Kato | G01K 1/14 |

FOREIGN PATENT DOCUMENTS

| | | | | |
|---|---|---|---|---|
| JP | | 2010023695 | 2/2010 | |
| JP | | 2011-240726 | * 12/2011 | ............... B60N 2/44 |
| WO | WO | 2013-092946 | * 6/2013 | ............... B60N 2/00 |

OTHER PUBLICATIONS

Craig DiLouie; Lighting: Five Steps to Savings; Occupancy Sensors: Passive Infrared, Ultrasonic and Dual-Technology; Sep. 2008,2 pages.

* cited by examiner

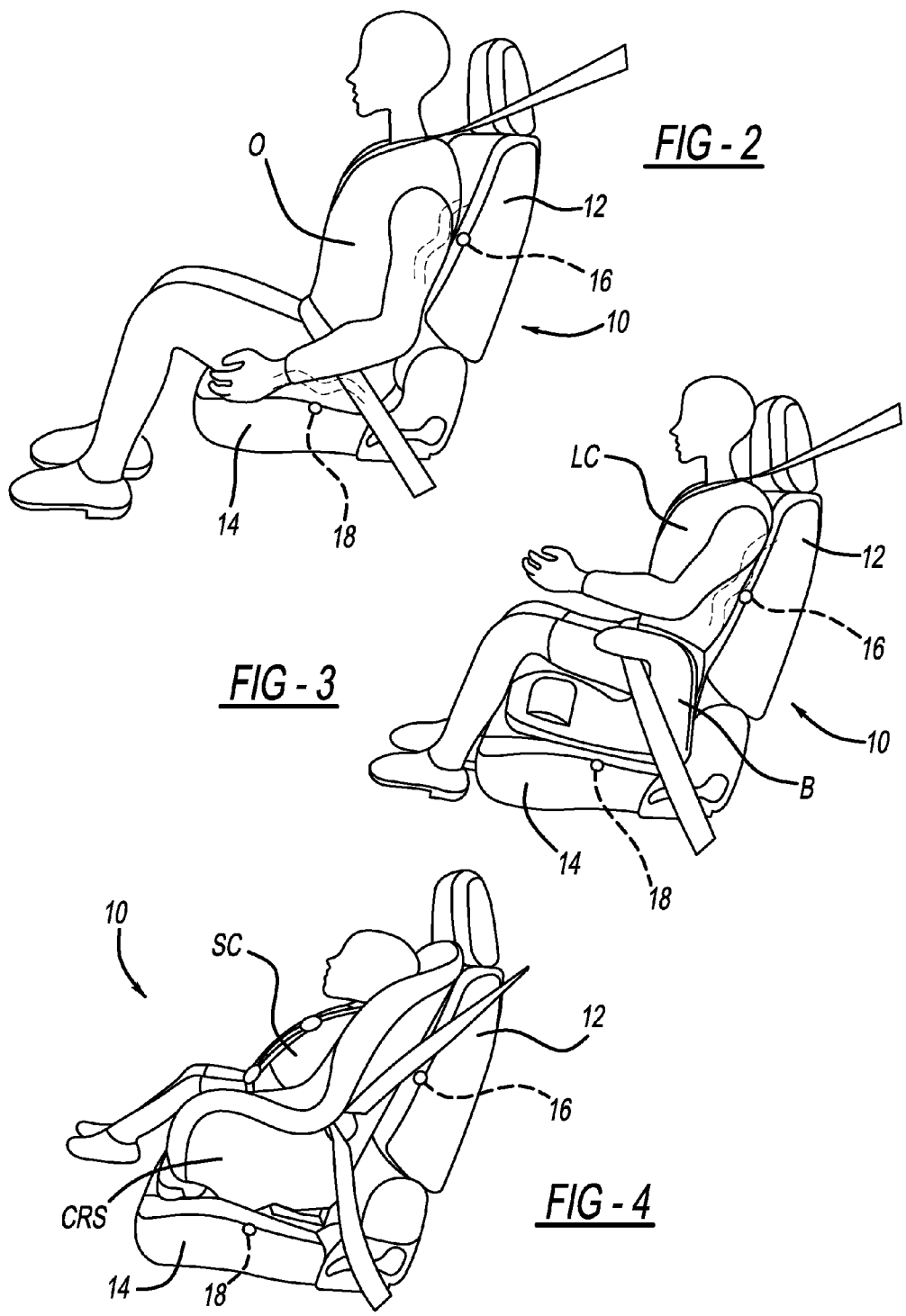

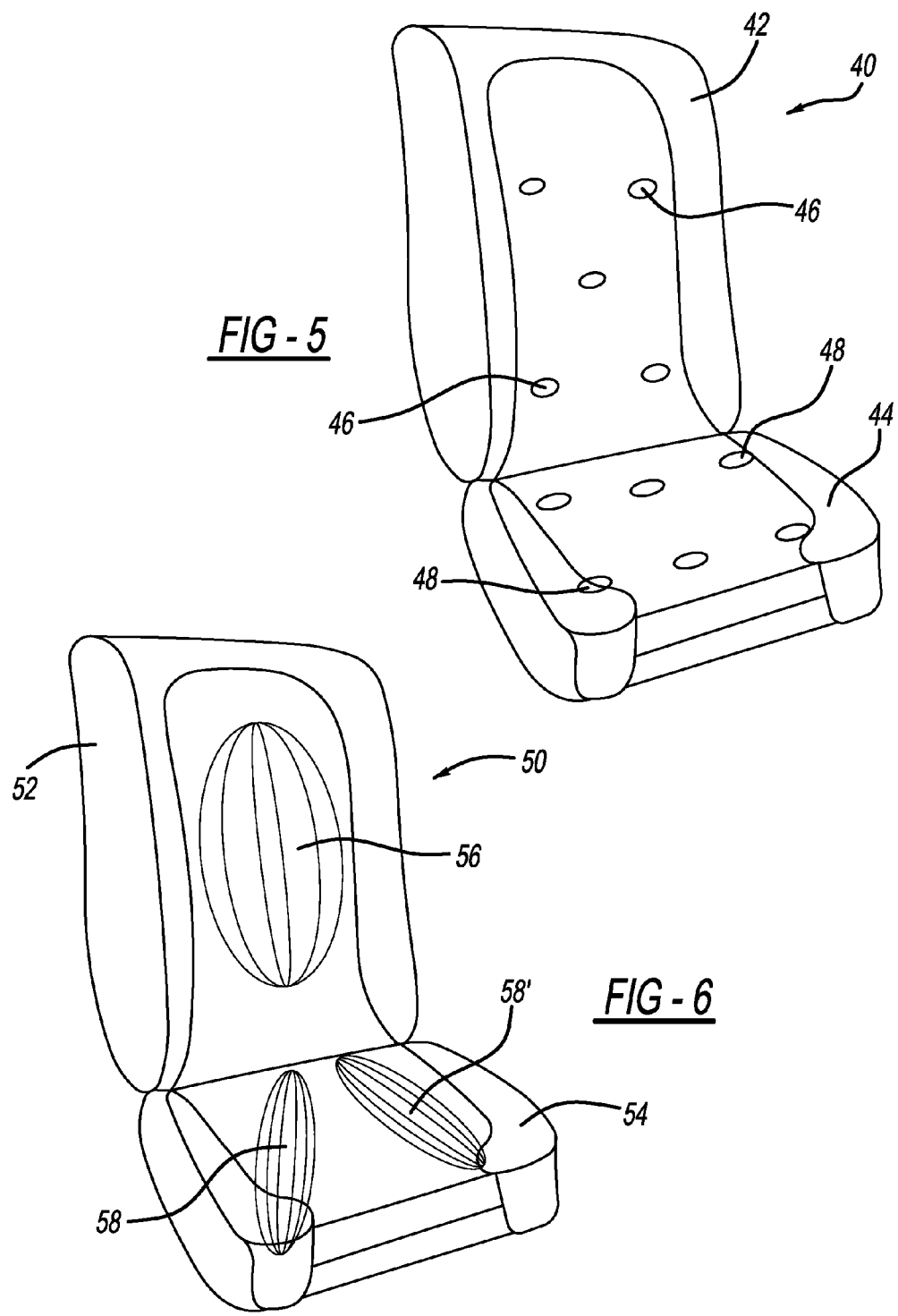

VEHICLE SEAT THERMISTOR FOR CLASSIFYING SEAT OCCUPANT TYPE

TECHNICAL FIELD

The disclosed inventive concept relates generally to vehicle seats and safety systems. More particularly, the disclosed inventive concept relates to a method and system for classifying differences between seat occupant types whereby a child in a child seat may be discerned from a child in a booster seat and from an adult.

BACKGROUND OF THE INVENTION

Safety systems for automotive vehicles provide both passive and active protection to seated passengers in both front and rear seats. The effectiveness of these systems depends on several factors, including the type of seated passenger. In rear seats, some passengers are adults while some are children. Of the children, some may be positioned in a child restraint system (CRS) while others may be positioned in a booster seat. The ideal safety system would be tailored to discern between these passengers and, in the case of children, their type of seating.

It is recommended that children occupy rear seats up to a certain point, thus improvements are desired to identification systems for rear seats. However, such improvements could be applied to front seat classification as well. Such features may also add additional confidence or granularity to current classification methods in combination with other existing systems, or perhaps as an alternative to those systems, depending on the final execution.

Accordingly, providing a safety system that is capable of distinguishing between three conditions—a seated adult vs. a seated child and, if a child, a child seated in a CRS vs. a child seated in a booster seat—is desired.

SUMMARY OF THE INVENTION

The disclosed inventive concept provides a solution to the need for distinguishing between adult and child vehicle passengers as well as between a child seated in a CRS and a child seated in a booster seat. The inventive concept disclosed herein relies on the fact that humans, even with clothing, will transfer and absorb heat differently than inanimate objects.

Particularly, the disclosed inventive concept provides temperature-based method for minimally separating three conditions-adult vs. child in CRS vs. child on booster. A variety of thermal sensors may be employed, though the thermistor is a preferred non-limiting example of such a sensor. Because the resistance of a thermistor varies with temperature more than conventional resistors, this type of resistor is thus highly sensitive to changes in local temperatures. However, it is to be understood that conventional resistors and resistance temperature detectors (RTDs) may be suitable for use in the disclosed inventive concept.

The disclosed inventive concept includes at least one classification thermistor/temperature sensing device, at least one reference thermistor, an algorithm to compute and classify conditions, and related wiring and hardware.

The classification thermistor/temperature sensing device is located within in a vehicle seat cushion assembly and in a vehicle seat back assembly. The temperature sensors are used to detect heat transfer between an object in contact with the cushion through the seat trim and, if applicable, some amount of seat comfort base material such as foam.

The reference thermistor may be provided to enhance robustness of classification determination. For example use of existing thermistors such as those providing exterior vehicle temperatures, those associated with interior climate control in one or more rows of a vehicle can be used for reference value comparisons and to measure the rate of change between "reference" and each "classification" sensor as well as the magnitude of temperature difference.

The algorithm computes and classifies conditions based on at least the magnitude and/or the rate of temperature change between at least one classification sensor and one or more reference sensors.

The disclosed inventive concept provides advanced technology that is less complex and is more cost efficient in distinguishing between types of seated passengers than known systems. The disclosed inventive concept incorporates new algorithms and today's improved thermistors with existing vehicle technologies.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 2 illustrates the seat of FIG. 1 of the disclosed inventive concept showing a seated adult passenger;

FIG. 3 illustrates the seat of FIG. 1 of the disclosed inventive concept showing a child passenger seated in a booster seat;

FIG. 4 illustrates the seat of FIG. 1 of the disclosed inventive concept showing a child passenger seated in a child restraint system;

FIG. 5 is a perspective view of a first alternative embodiment of the sensor arrangement for a vehicle seat according to the disclosed inventive concept;

FIG. 6 is a perspective view of a second alternative embodiment of the sensor arrangement for a vehicle seat according to the disclosed inventive concept.

DETAILED DESCRIPTION OF THE PREFERRED EMBODIMENT

Figure 1:
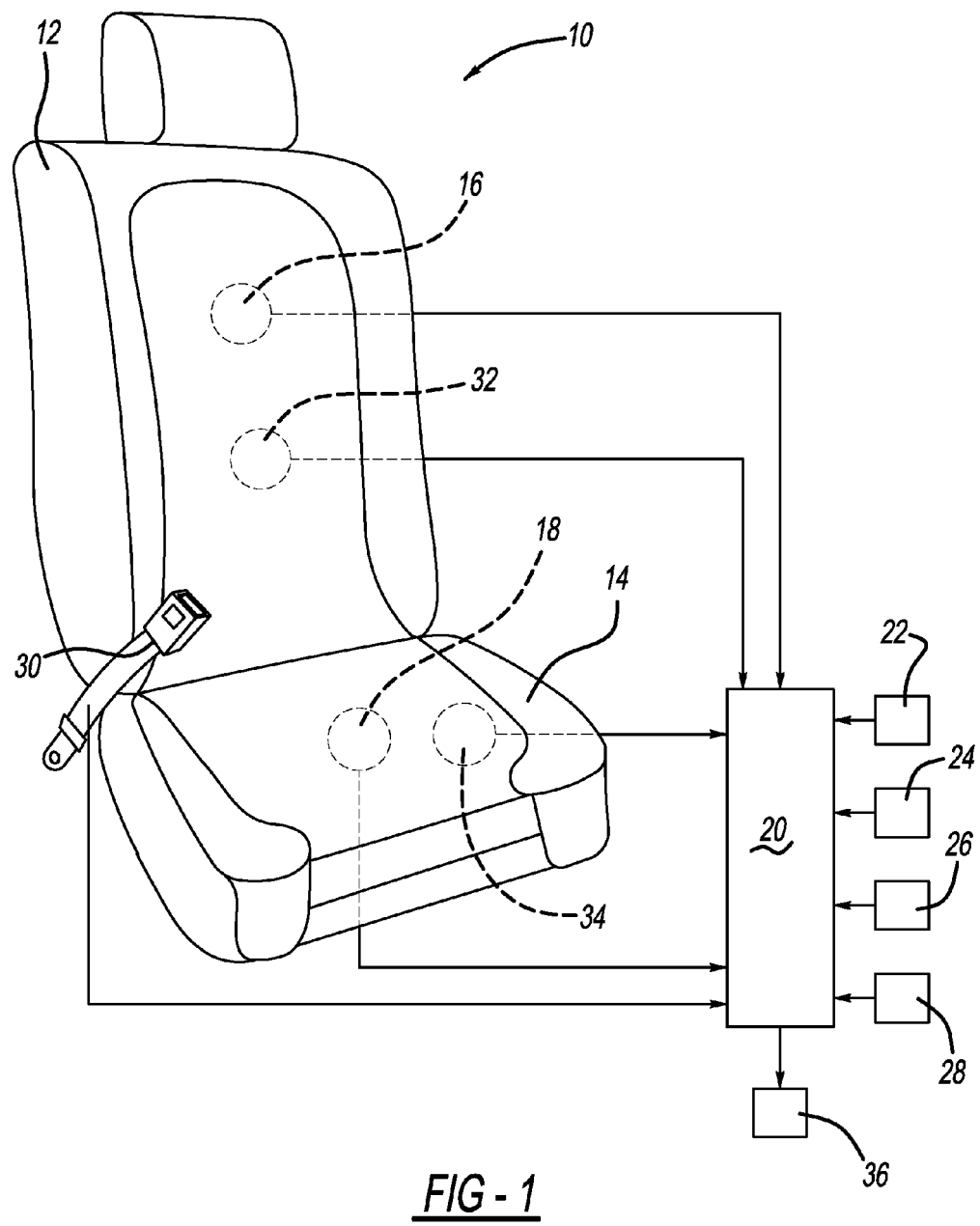
FIG. 1 is a perspective view of a seat having the sensor arrangement of the disclosed inventive concept.

In the following figures, the same reference numerals will be used to refer to the same components. In the following description, various operating parameters and components are described for different constructed embodiments. These specific parameters and components are included as examples and are not meant to be limiting.

Referring to FIG. 1, a perspective view of a seat of the disclosed inventive concept is shown. The seat, generally illustrated as 10, includes a seat back 12 and a seat base 14. It is to be understood that the seat 10 is shown for illustrative purposes only and that the shapes and sizes of the seat back 12 and the seat base 14 are thus not intended as being limiting.

The seat 10 includes thermal classification sensors for sensing the presence and type of passenger. The thermal classification sensors may be any type of temperature sensor, though thermistors are preferred as non-limiting examples. Particularly, the seat back 12 is fitted with at least one thermal classification sensor 16 and the seat base 14 is fitted with at least one thermal classification sensor 18. The number and positions of the thermal classification sensors 16 and 18 as shown are only suggestive as additional thermal sensors may be provided in different locations in the seat back 12 and the seat base 14. The thermal classification sensors 16 and 18 are preferably positioned between the seat foam and seat trim and may possibly be embedded in the seat foam.

The thermal classification sensors 16 and 18 provide output signals to a controller 20. The controller 20 may also receive additional information from reference sensors such as, but not limited to, an exterior temperature sensor 22, an interior climate sensor 24 provided in one or more rows or locations, a glass-mounted temperature sensor 26 fitted, for example, to the windshield, a sunroof or other glass roof, side or rear glass to detect sunload, an in-seat climate control temperature sensor 28, a buckle sensor 30, a first occupant weight sensor 32 located in the seat back 12, and a second occupant weight sensor 34 located in the seat base 14. One or more of these sensors may be part of the occupant classification system (OCS) commonly found in today's vehicles. The reference sensors 22, 24, 26, 28, 30, 32 and 34 may be single function or multi-function and may be placed in close proximity to the seat 10 or may be provided remotely depending on their function. The reference sensors 22, 24, 26, 28, 30, 32 and 34 may be placed on, within, or adjacent to the seat back 12 or the seat base 14. These reference sensors compare the magnitude or rate of change of thermal conditions associated with the thermal classification sensors 16 and 18. Like the thermal classification sensors 16 and 18, the reference sensors 22, 24, 26, 28, 30, 32 and 34 may be of any type of sensor, such as but not limited to, thermistors.

The controller 20 receives the information generated by the thermal classification sensors 16 and 18 as well as the information generated by the reference sensors 22, 24, 26, 28, 30, 32 and 34 and, using a programmed algorithm, computes and classifies conditions based on at least the magnitude and/or rate of temperature change between at least one of the thermal classification sensors 16 and 18 and one or more of the reference sensors 22, 24, 26, 28, 30, 32 and 34. The thermal classification system embedded in the algorithm of the controller 20 may be combined with non-thermal information, such as information generated by a buckle-switch detector, seat-weight sensors, thermal images, vision-based shape/pattern detection, or other occupant classification systems to further enhance robustness and/or granularity of classification.

Once the type of passenger is classified based on inputs from the thermal classification sensors 16 and 18 and from the reference sensors 22, 24, 26, 28, 30, 32 and 34, the seated occupant is classified and this information is then forwarded to one or more elements of the vehicle's safety system 36, such as the airbag deployment controller.

FIGS. 2, 3 and 4 illustrate the seat 10 having different passengers seated therein. FIG. 2 illustrates an adult occupant O seated in the seat 10. With this type of passenger, both of the thermal classification sensors 16 and 18 sense a temperature increase. This information is transmitted to the controller 20 and, based on information received from the reference sensors 22, 24, 26, 28, 30, 32 and 34, the seat occupant is classified as an adult occupant.

FIG. 3 illustrates a larger child occupant LC seated in a booster seat B positioned in the seat 10. With this type of passenger in the booster seat B, only the thermal classification sensor 16 located in the seat back 12 senses a temperature. The thermal classification sensor 18 located in the seat base 14 is insulated from the body heat of the child occupant LC because of the booster seat B and thus no change in temperature is sensed. This information is transmitted to the controller 20 and, based on information received from the reference sensors 22, 24, 26, 28, 30, 32 and 34, the seat occupant is classified as a child seated in a booster seat.

FIG. 4 illustrates a smaller child occupant SC seated in a child restraint system CRS positioned in the seat 10. With this type of passenger in the child restraint system CRS, neither the thermal classification sensor 16 located in the seat back 12 nor the thermal classification sensor 18 located in the seat base 14 senses a temperature as both thermal classification sensors 16 and 18 are insulated from the body heat of the child occupant SC because of the child restraint system CRS. This information, together with information generated by the occupant classification system, is transmitted to the controller 20 and the seat occupant is classified as a child seated in a child restraint system.

Figure 7:
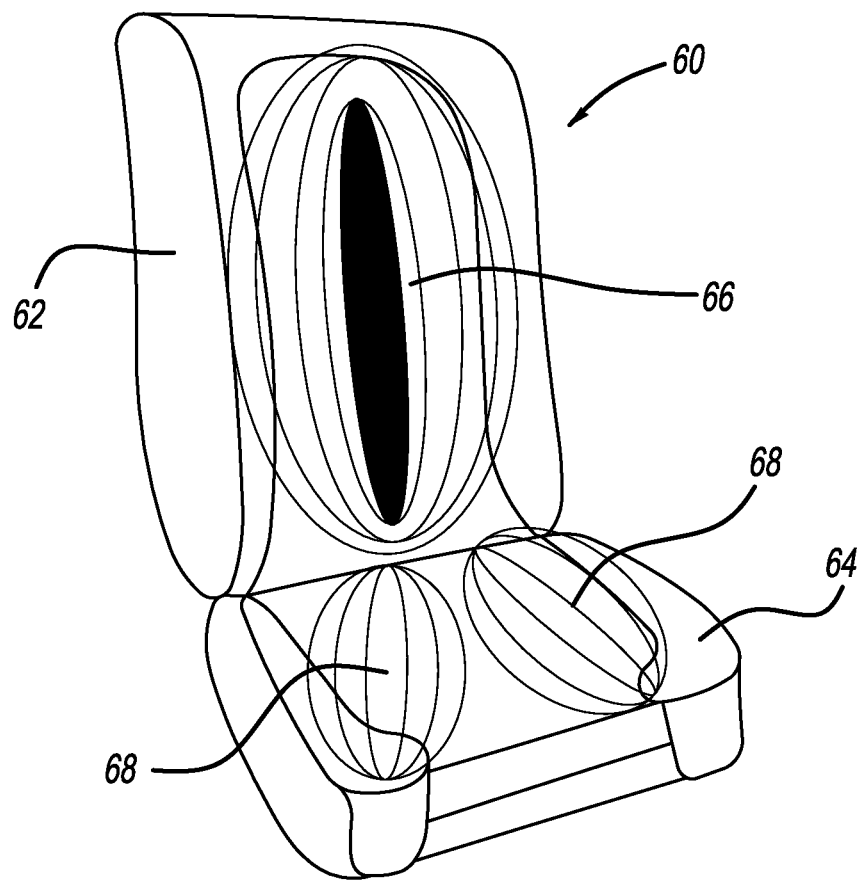
FIG. 7 is a perspective view of a third alternative embodiment of the sensor arrangement for a vehicle seat according to the disclosed inventive concept.

While FIGS. 1 through 4 illustrate the basic seat of the disclosed inventive concept having thermal classification sensors 16 and 18 fitted thereto, it is to be understood that other arrangements may be possible. FIGS. 5 through 7 illustrate possible variations in both the number and placement of the classification sensors on the vehicle seat. The array of sensors illustrated in FIGS. 5 through 7 are provided for more accurate detection or a grid to detect gradations that may indicate a large adult occupant as opposed to a small adult occupant where the radiating heat pattern is spread out or heat over the surface area indicates occupant size. This array can also be tuned to address clothing effects. It is to be understood that the variations shown in FIG. 5 through 7 are intended as being illustrative only and are not intended as being limiting as other variations may be possible without deviating from either the spirit or scope of the disclosed inventive concept.

Referring to FIG. 5, a perspective view of a seat according to a first variation of the disclosed inventive concept, generally illustrated as 40, is shown. The seat 40 includes a seat back 42 and a seat base 44. A plurality of thermal classification sensors 46 are positioned in the seat back 42. A plurality of thermal classification sensors 48 are positioned in the seat base 44. The number and placement of the thermal classification sensors 44 and 46 are for illustrative purposes only and are not intended as being limiting.

Referring to FIG. 6, a perspective view of a seat according to a second variation of the disclosed inventive concept, generally illustrated as 50, is shown. The seat 50 includes a seat back 52 and a seat base 54. A thermal classification sensor 56 is provided in the seat back 52 while a pair of thermal classification sensors 58 and 58' are provided in the seat base 54. The concentric rings shown in relation to the thermal classification sensors 56, 58 and 58' illustrate the fact that the most direct contact with the seated occupant has the greatest thermal sensing effect.

Referring to FIG. 7, a perspective view of a seat according to a third variation of the disclosed inventive concept, generally illustrated as 60, is shown. The seat 60 includes a seat back 62 and a seat base 64. A thermal classification sensor 66 is provided in the seat back 62 while a pair of thermal classification sensors 68 and 68' are provided in the seat base 64. Thus, while the thermal classification sensors 66, 68 and 68' shown in FIG. 7 are similar in shape and placement to the thermal classification sensors 56, 58 and 58' discussed above with respect to FIG. 6, they are larger than the thermal classification sensors 56, 58 and 58' and thus are capable of being more sensitive to changes in heat levels. As with the thermal classification sensors 56, 58 and 58', the concentric rings shown in relation to the thermal classification sensors 66, 68 and 68' illustrate the fact that the most direct contact with the seated occupant has the greatest thermal sensing effect.

Variations and Additional Considerations

For further improved robustness, one or more of the reference sensors 22, 24, 26, 28, 30, 32 and 34 may be located adjacent the seat cushion, in a door panel or within the side of a vehicle seat cushion where the occupant is not in contact with the cushion and the sensor is not exposed to the sun. Alternatively, the ideal location may be under a cushion or seat frame. The location may be on the lower front area of a seat cushion, up on top of a cushion under or adjacent the headrest area or on a seatback. The location may be optimized for different vehicle environments and package conditions.

It should also be noted that it may be possible to simply relocate an existing interior climate control temperature sensor to provide optimal dual or multi-purpose functionality, serving both as a reference interior climate control temperature sensor and a proximate reference temperature sensor for use in determining the most accurate rate and magnitude of difference, relative to a thermal classification sensor.

Currently, more front seats than rear have seat-based cushion and/or seatback climate controls built into the seat assembly. It is presumed that more rear seats will have this option available over time. In any case, it may be additionally possible to integrate or combine functions of the presumably thermistor-based temperature controls associated with in-seat climate control, perhaps using some of the same hardware to provide dual or multi-purpose functionality. First, a seat with heater or cooling activated is likely to be occupied, but cannot be guaranteed based on activation of in-seat climate control alone. The rate or magnitude of thermal change will be affected if an object that emits or absorbs heat energy is in contact with the seating surface. At cold temperatures, the seat may reach a target temperature more quickly relative to the outside or interior air temperature if an occupant is sitting on the seat. The seat may cool more slowly in the summer with an occupant sitting on it, having a constant body temperature, be within a few degrees, etc. These considerations can be programmed into computational algorithms and would require some development to optimize with whatever technology is incorporated. The use of sensors that may be provided in current or future vehicles detecting sun load or heat on the glass may also be used in algorithmic temperature rate and magnitude changes for a classification sensor relative to any appropriate combination of reference sensors available for a given vehicle.

The disclosed thermal sensor-based system for occupant classification could likely minimally detect the difference between an adult occupant heat transfer at the seat cushion and the seat back, a boosted child transferring heat only to the seatback and an unoccupied seat/child in a CRS condition. If used in combination with a buckle sensor, a seat weight sensor, optical circuit switching, thermal imaging, vision, shape or pattern-based recognition, or other occupant classification systems to further enhance robustness and/or granularity of classification.

One skilled in the art will readily recognize from such discussion, and from the accompanying drawings and claims that various changes, modifications and variations can be made therein without departing from the true spirit and fair scope of the invention as defined by the following claims.

What is claimed is:

1. A system for classifying an object occupying a vehicle seat comprising:
   a seat having a seat back and a seat base;
   a signal-generating classification thermal sensor fitted to said seat back;
   a signal-generating classification thermal sensor fitted to said seat base;
   a signal-generating reference sensor; and
   a controller to which said sensors are operatively associated,
   wherein said controller classifies the object occupying the vehicle seat as an adult when said thermal sensors identify that there is an increase in temperature in both the seat back and the seat base, a child in a booster seat when said thermal sensors identify that there is an increase in temperature in the seat back alone, or a child in a child restraint system when said thermal sensors identify that there is no increase in temperature in neither the seat back nor the seat base.

2. The system for classifying an object occupying a vehicle seat of claim 1, wherein said thermal sensors are thermistors.

3. The system for classifying an object occupying a vehicle seat of claim 1, wherein said reference sensor is associated with said seat.

4. The system for classifying an object occupying a vehicle seat of claim 1, wherein said reference sensor is positioned in a location on the vehicle that is remote from said seat.

5. The system for classifying an object occupying a vehicle seat of claim 1, wherein said reference sensor is an exterior temperature sensor.

6. The system for classifying an object occupying a vehicle seat of claim 1, wherein said reference sensor is an interior climate sensor.

7. The system for classifying an object occupying a vehicle seat of claim 1, wherein said reference sensor is a glass-mounted temperature sensor.

8. The system for classifying an object occupying a vehicle seat of claim 1, wherein said reference sensor is an in-seat climate control temperature sensor.

9. The system for classifying an object occupying a vehicle seat of claim 1, wherein said reference sensor is a buckle sensor.

10. The system for classifying an object occupying a vehicle seat of claim 1, wherein said reference sensor is an occupant weight sensor.

11. A system for classifying an object occupying a vehicle seat comprising:
    a seat having a seat back and a seat base;
    a signal-generating classification thermal sensor associated with said seat;
    a signal-generating reference sensor; and
    a controller to which said sensors are operatively associated,
    wherein said controller classifies the object occupying the vehicle seat as an adult when said thermal sensor identifies that there is an increase in temperature in both the seat back and the seat base, a child in a booster seat when said thermal sensor identifies that there is an increase in temperature in the seat back alone, or a child in a child restraint system when said thermal sensor identifies that there is no increase in temperature in neither the seat back nor the seat base.

12. The system for classifying an object occupying a vehicle seat of claim 11, wherein said signal-generating classification thermal sensor is fitted to said seat back.

13. The system for classifying an object occupying a vehicle seat of claim 11, wherein said signal-generating classification thermal sensor is fitted to said seat base.

14. The system for classifying an object occupying a vehicle seat of claim 11 including two signal-generating classification thermal sensors, one of which is fitted to said seat back and the other is fitted to said seat base.

15. The system for classifying an object occupying a vehicle seat of claim 11, wherein said thermal sensor is a thermistor.

16. The system for classifying an object occupying a vehicle seat of claim 11, wherein said reference sensor is associated with said seat.

17. The system for classifying an object occupying a vehicle seat of claim 11, wherein said reference sensor is positioned in a location on the vehicle that is remote from said seat.

18. A method for classifying an occupant in a vehicle seat, the method comprising the steps of:
    forming a vehicle having a seat with a seat back and a seat base, at least one thermal sensor fitted to said back and said base, a reference sensor, and a controller; and
    causing said controller to classify the object based on sensor inputs from the sensors,
    wherein said controller classifies the object occupying the vehicle seat as an adult when the at least one thermal sensor identifies that there is an increase in temperature in both the seat back and the seat base, a child in a booster seat when the at least one thermal sensor identifies that there is an increase in temperature in the seat back alone, or a child in a child restraint system when the at least one thermal sensor identifies that there is no increase in temperature in neither the seat back nor the seat base.

19. The method for classifying an occupant in a vehicle seat of claim 18, wherein said reference sensor is selected from the group consisting of an exterior temperature sensor, an interior climate sensor, a glass-mounted temperature sensor, an in-seat climate control temperature sensor, a buckle sensor, and a weight sensor.

* * * * *